United States Patent

Campbell et al.

[11] Patent Number: 5,527,598
[45] Date of Patent: Jun. 18, 1996

[54] COMPOSITE SANDWICH ELEMENT

[75] Inventors: Frederick S. Campbell, Wolfeboro, N.H.; Peter Brownell, Providence, R.I.; Roland E. Jordan, Attleboro, Mass.

[73] Assignee: Albany International Research Co., Mansfield, Mass.

[21] Appl. No.: 177,562

[22] Filed: Jan. 5, 1994

Related U.S. Application Data

[63] Continuation-in-part of Ser. No. 57,620, May 5, 1993, abandoned.

[51] Int. Cl.$^6$ .................................................. C23C 16/00
[52] U.S. Cl. .......................... 428/251; 428/282; 428/285; 428/286; 428/319.1; 428/319.7
[58] Field of Search .................... 428/311.5, 317.1, 428/318.4, 319.1, 285, 251, 282, 286, 319.7

[56] References Cited

U.S. PATENT DOCUMENTS

| | | | |
|---|---|---|---|
| 3,779,854 | 12/1973 | Dukert et al. | 161/156 |
| 4,054,711 | 10/1977 | Botsolas | 428/228 |
| 4,186,044 | 1/1980 | Bradley et al. | 156/275.5 |
| 4,342,810 | 8/1982 | Adcock | 428/215 |
| 4,499,145 | 2/1985 | Yanagida et al. | 428/418 |
| 4,557,961 | 12/1985 | Gorges | 428/117 |
| 4,567,092 | 1/1986 | Catrain et al. | 422/246 |
| 4,818,603 | 4/1989 | Mueller | 428/316.6 |
| 4,874,648 | 10/1989 | Hill et al. | 428/35.9 |
| 4,883,708 | 11/1989 | Kariya et al. | 428/263 |
| 4,915,998 | 4/1990 | Parenti, Jr. et al. | 428/76 |
| 4,923,741 | 5/1990 | Kosmo et al. | 428/252 |
| 4,960,633 | 10/1990 | Hiza et al. | 428/215 |
| 4,978,572 | 12/1990 | Akao | 428/323 |
| 5,017,429 | 5/1991 | Akao | 428/349 |
| 5,110,668 | 5/1992 | Minnick | 428/215 |
| 5,229,184 | 7/1993 | Campbell et al. | 428/113 |

Primary Examiner—Christopher W. Raimund
Attorney, Agent, or Firm—Fish & Richardson

[57] ABSTRACT

A composite sandwich element has at least one wall comprising phenolic resin binder and a layer of cellular polymeric foam or felt of imide polymeric material bonded thereto. In the presence of fire, the composite sandwich element has levels of heat release, flammability, smoke release and toxic gas release below predetermined levels considered suitable for use within the passenger compartment of a commercial aircraft. In preferred embodiments, there are two walls with the cellular polymeric material disposed therebetween. Preferably, the wall includes glass fibers in web form, with the polymeric resin binder serving as an adhesive or reinforcing binder. A barrier film, e.g. metallic or polymeric, may be included to render the composite sandwich element impermeable to air.

18 Claims, 6 Drawing Sheets

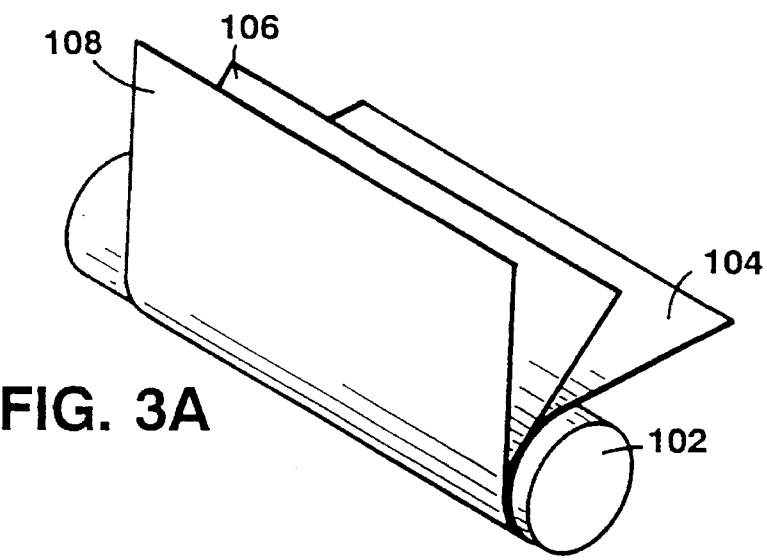
FIG. 3A
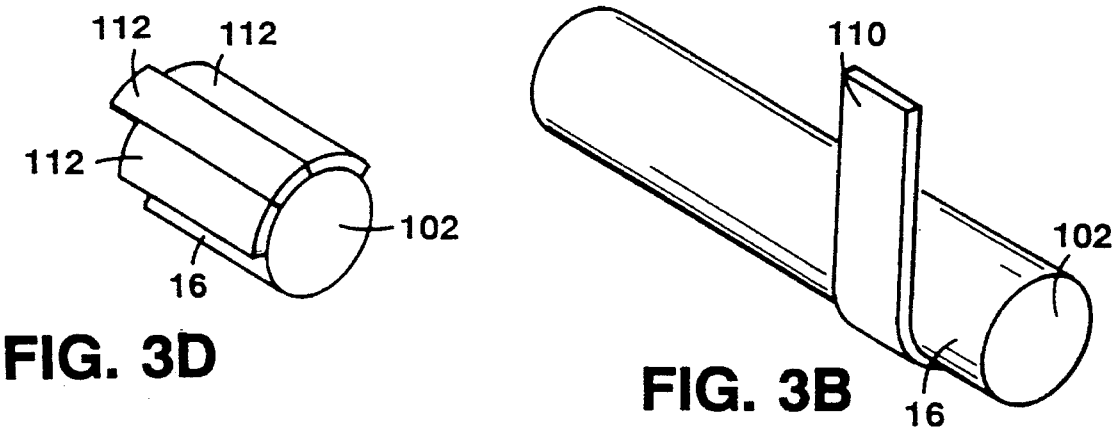
FIG. 3D
FIG. 3B
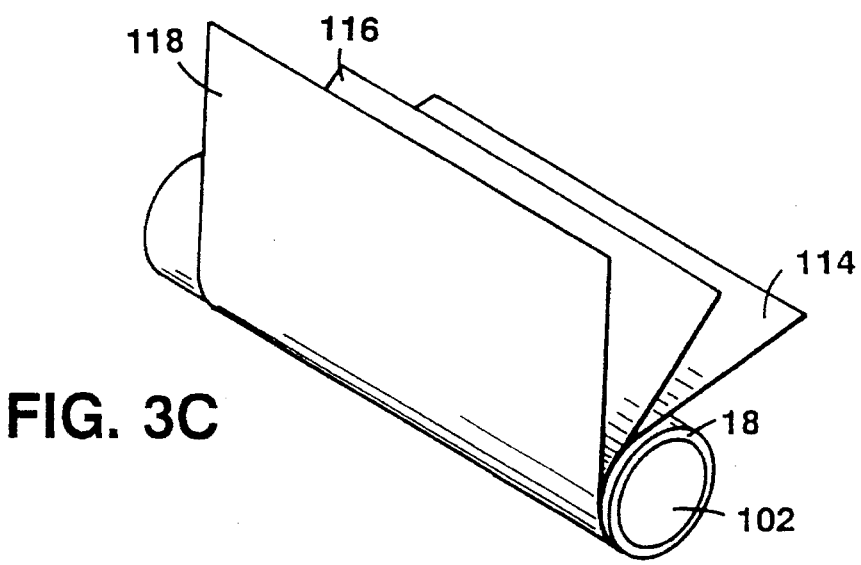
FIG. 3C

5,527,598

COMPOSITE SANDWICH ELEMENT

This application is a continuation-in-part of U.S. Ser. No. 08/057,620, filed May 5, 1993, now abandoned.

BACKGROUND OF THE INVENTION

The invention relates to elements formed of a composition of glass fibers and reinforcing polymeric resin, and expanded or cellular polymeric foam or felt.

It is well known to use compositions of polymeric resins, with or without glass fibers, for forming structural elements and, in particular, non-load bearing structural elements, for replacing heavier or more expensive materials. However, in certain environments, e.g., within the passenger compartments of modern aircraft, such composites are often unable to meet stringent requirements of strength and performance established for the safety of those within that environment. These requirements may be particularly strict where there is a perceived danger of fire. It is well-known that the performance of certain polymeric-based materials may be unsatisfactory, or even life-threatening, for reasons of heat release, flammability, smoke release and/or toxic gas release, and also for lack of strength, impact resistance and compression resistance, making these materials unsuitable for use in environments where they might otherwise provide a substantial benefit. A prohibitively high level of heat release, flammability and smoke and/or toxic gas release can be reduced by adding fire retardants to the polymeric resins.

In certain environments, the composite may transmit an undesirable level of heat and/or sound.

SUMMARY OF THE INVENTION

It has been found that the degree of sound or heat transmission can be lessened by the incorporation of an insulating element into the composite. This invention describes this insulating layer as an expanded or cellular polymeric foam or felt. An effective material has been found to be an imide foam.

In the manufacture of the composite, the insulating material is bonded into, and becomes part of, the composite. In this position, the insulating material contributes its insulating qualities and structural stiffness.

The composite is comprised of one or two outer walls, primarily for structural advantages. These outer walls are layers of polymeric resin with or without the incorporation of a glass fiber web. The outer wall is bonded to an inner layer of polymeric foam or felt which, with the composite, reduces the transmission levels of sound and/or temperature. The composite can include a barrier to render the composite impermeable to the flow of air.

More particularly, according to the invention, a composite sandwich element comprises at least one wall layer comprising polymeric resin binder, and a layer of cellular polymeric foam or felt of imide polymeric material bonded to a surface of the wall layer, the composite sandwich element in the presence of fire having levels of heat release, flammability, smoke release and toxic gas release below predetermined levels considered suitable for use within the passenger compartment of a commercial aircraft.

Preferred embodiments of this aspect of the invention may include one or more of the following additional features. The wall further comprises glass fibers in web form, and the polymeric resin binder serves as an adhesive or reinforcing binder. The composite sandwich element comprises a first wall and a second wall, and the layer of cellular polymeric foam or felt is disposed between the first wall and the second wall. The composite sandwich element further comprises a barrier film adapted to render the composite sandwich element impermeable to air, i.e. the maximum flow of air through the composite sandwich, with a pressure differential of 20 psi thereacross, does not exceed 0.005 ft$^3$/min/ft$^2$. The barrier film may comprise a metallic film, e.g. aluminum, or a polymeric film, e.g. consisting essentially of polyvinylidene fluoride. The polymeric resin binder of the wall comprises chemical agents adapted to reduce the rate of heat release, and the layer of cellular polymeric foam or felt of imide polymeric material bonded to a surface of the wall layer having thickness in the range of at least about 0.100 inch. Preferably, the chemical agents adapted to reduce the rate of heat release are selected from the group consisting of aluminum trihydrate and zinc borate, and the composite sandwich element has a peak heat release rate of less than 50 kw/m$^2$ and a two minute heat release of less than 50 kw-min/m$^2$ when tested in accordance with the requirements of FAR 25.853(a–1) through Amendment 25–66 and FAR 121.312(a)(1) through Amendment 121–198. More preferably, the peak heat release rate is less than 45 kw/m$^2$ and the two minute heat release of less than 45 kw-min/m$^2$.

According to another aspect of the invention, a method for forming a composite sandwich element which, in the presence of fire, has levels of heat release, flammability, smoke release and toxic gas release below predetermined levels considered suitable for use within the passenger compartment of a commercial aircraft comprises the steps of providing a layer of cellular polymeric foam or felt of imide polymeric material, coating one or both outer surfaces of the layer of cellular polymeric foam or felt of imide polymeric material with polymeric resin binder, and applying heat and pressure to cure and bond the composite sandwich element.

Preferred embodiments of this aspect of the invention may include one or more of the following additional features. The method comprises the further step of applying a reinforcing glass fiber network in web form to one or both outer surfaces of the layer of cellular polymeric foam or felt of imide polymeric material. The method comprises the step of applying the reinforcing glass fiber network in web form before, during or after coating the layer of cellular polymeric foam or felt of imide polymeric material with the polymeric resin binder. The method comprises the step of applying a barrier film, e.g. a polymeric material, preferably consisting essentially of polyvinylidene fluoride, in the region of one or both outer surfaces of the composite sandwich element to render the composite sandwich element impermeable to air. The method comprises the further step of molding the composite sandwich element to a desired curvilinear shape.

Objectives of the invention include to provide a composite sandwich element which, in the presence of fire, has levels of heat release, flammability, smoke release and toxic gas release below predetermined levels considered suitable for use within the passenger compartment of a commercial aircraft.

These and other features and advantages of the invention will be apparent from the following description of presently preferred embodiments, and from the claims.

BRIEF DESCRIPTION OF THE DRAWINGS

FIGS. 3A, 3B, 3C and 3D are somewhat diagrammatic perspective views of a sequence of steps for forming a composite sandwich element of the invention in the form of a duct, using a table wrap method, where FIG. 3A shows formation of a first (inner) wall, FIG. 3B shows a first method of formation of an intervening layer, FIG. 3C shows formation of a second (outer) wall, and FIG. 3D shows a second method of formation of the intervening layer.

DESCRIPTION OF THE PREFERRED EMBODIMENT(S)

Figure 1:
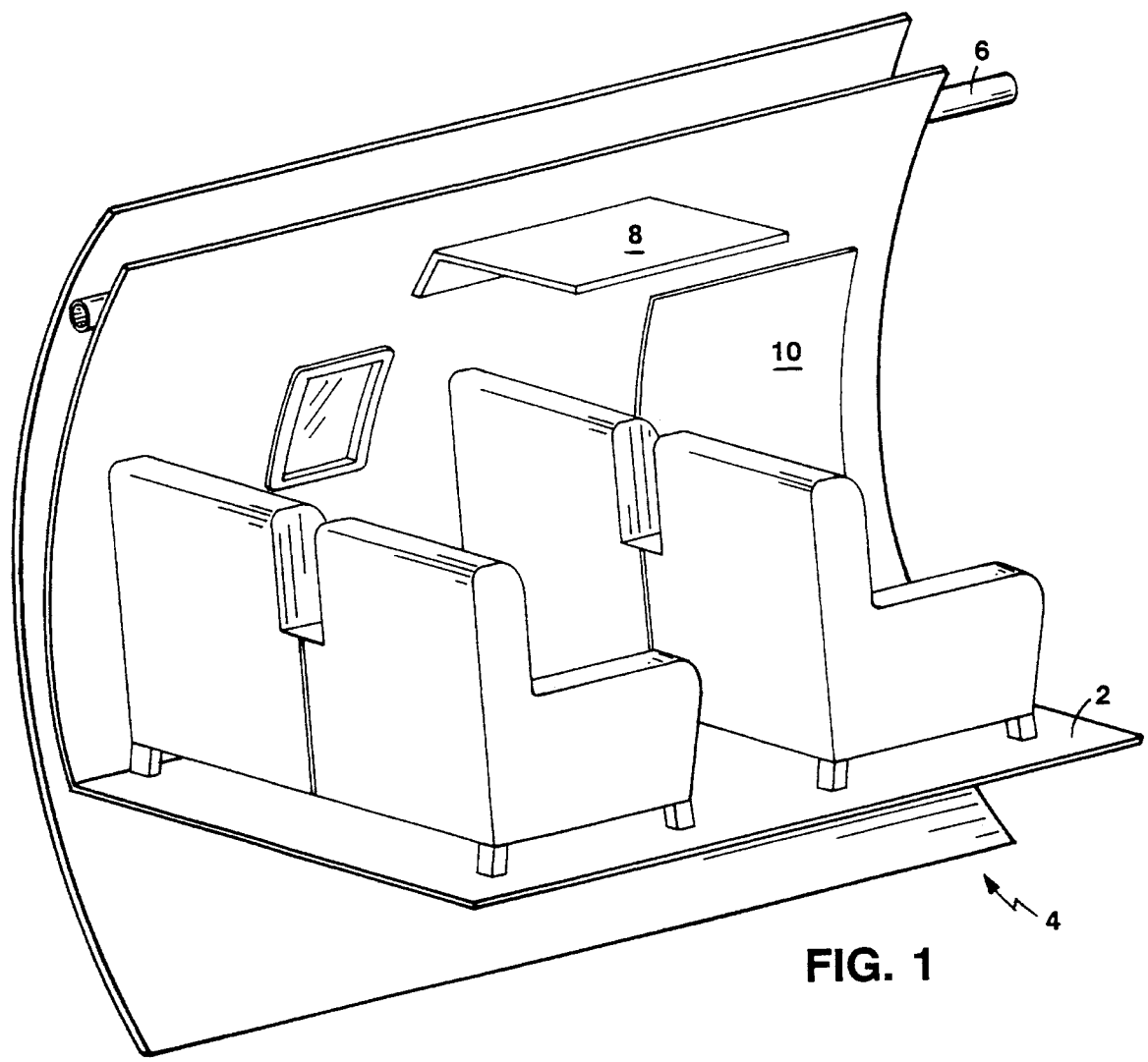
FIG. 1 is a perspective view of an aircraft passenger compartment equipped with structural, non-weight bearing composite sandwich elements of the invention.

Referring to FIG. 1, the passenger compartment or pressure shell 2 of a modern commercial jet aircraft 4 is provided with improved structural, non-weight-bearing composite sandwich elements of the invention, including, e.g., air-conditioning duct 6, ceiling panels 8 and wall panels 10.

According to the invention, composite sandwich elements suitable for use within the passenger compartment of a commercial aircraft are formed, at least in part, of first and second walls formed of a web of random or oriented non-woven or woven glass fibers impregnated with a low heat release polymeric binder containing a chemical flame retardant, with an intervening layer of cellular polymeric foam disposed therebetween.

In the preferred embodiment, the polymeric binder used in composite sandwich element is a commercially available phenolic resin selected to have as low a heat release as possible. The fire retardant agents that are combined with the resin to form at least one of the walls may comprise one or more components that act to reduce the heat release rate in a manner common to the state-of-the-art. Examples of suitable fire retardant agents and/or compositions include aluminum trihydrate, zinc borate and similar chemicals.

The cellular polymeric material employed in the intervening layer is preferably formed of imide resin, in foamed or cellular state, which is known to have an exceedingly low heat release, e.g. as described below, and works in combination with the wall elements to maintain acceptably low levels of heat release in the composite sandwich element. The layer of cellular polymeric material serves also as a heat insulator for any variation of temperature across the composite sandwich element, and it serves as a sound insulator to reduce the acoustic level across the composite sandwich element.

Figure 2:
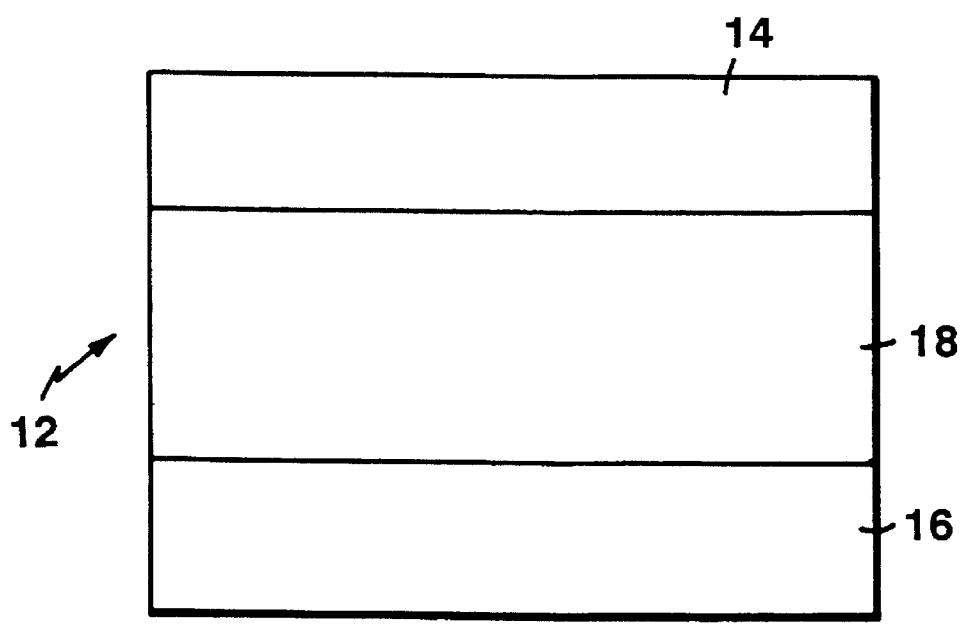
FIG. 2 is a somewhat diagrammatic side view of one embodiment of a composite sandwich element of the invention.
Figure 2A:
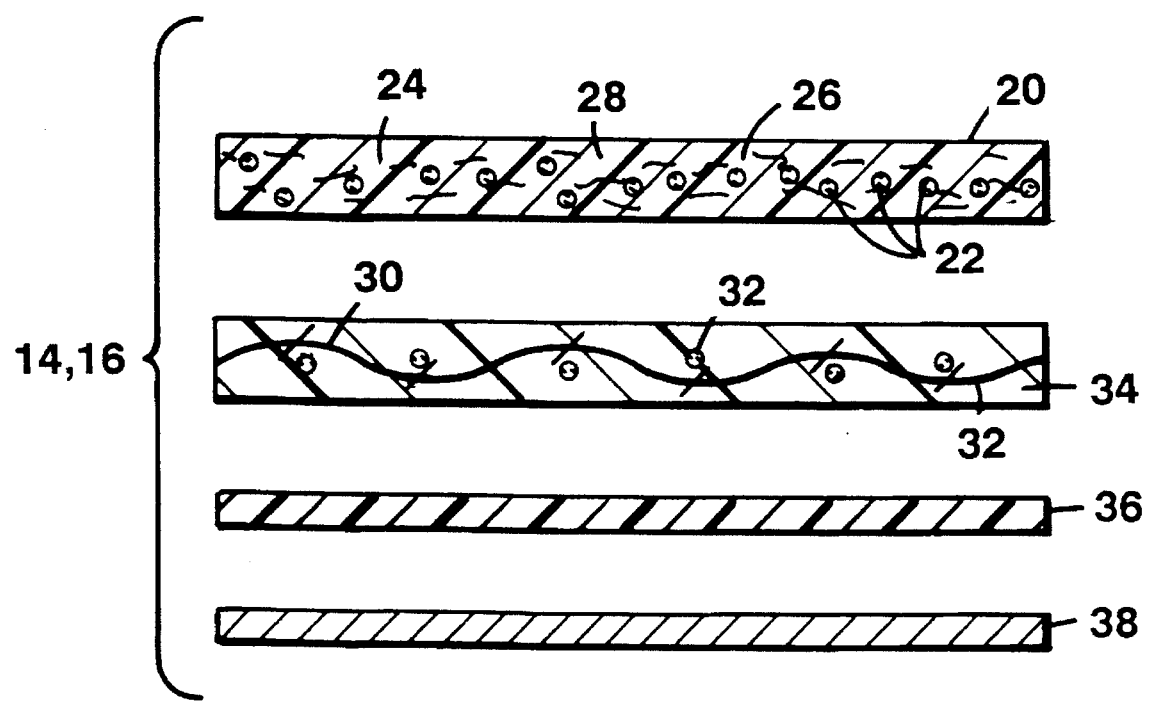
FIG. 2A is a somewhat diagrammatic exploded side view of the lay-up of one embodiment of a wall of a composite sandwich element of the invention.

Referring to FIG. 2, a composite sandwich element 12 of the invention has a first wall 14 and a second wall 16, with an intervening layer 18 of cellular foam or felt disposed therebetween. Referring to FIG. 2A, the inventors have found that in a composite sandwich element 12 of the invention, walls 14, 16 each consisting of a non-woven web 20 of fibrous material, e.g., filament glass fibers 22, provides a relatively high void volume, with a substantially greater number of interstitial spaces or voids 24 (as compared to woven fabrics) within which the phenolic resin material 26 containing the chemical flame retardant 28 may be retained. The comparatively high resin content of the non-woven material imparts a relatively greater stiffness, e.g. as compared to the relatively lower stiffness of woven glass as a result of its lesser ability to hold resin.

Still referring to FIG. 2A, for improved strength, the walls of this composite sandwich of the invention may include a layer of woven cloth or coarsely woven, grid-like scrim 30, e.g. also of fibrous material such as filament glass fibers 32, as an inert, strengthening element. The scrim 30 is also impregnated with phenolic resin 34.

The glass fibers carry the volume of polymeric binder necessary to provide desired levels of stiffness, strength and integrity in the walls of the composite sandwich element, while the binder can also contain a fire retardant to reduce the heat release rate. The non-woven material has a high void volume which provides sufficient space in the fiber network for the polymeric binder and necessary fire retardants. The fibers in the non-woven sheet are not interconnected, e.g. as in woven cloth, which permits the fibers to move, e.g. with a mold, to conform to complex mold features, including, e.g., double curved contours and sharper radii, under pressure and/or heat during molding operations.

A thin layer of polymeric film 36, e.g. polyvinylidene fluoride or nylon film about 0.001 to 0.002 inch thick, renders the composite wall impermeable to flow of air (reduced air impermeability, or complete impermeability to air, is desirable in construction of ducts). The film is selected to bond to other components of the composite that are impregnated or coated with phenolic resin upon application of heat and pressure during the molding operation. The polymeric film, e.g., polyvinylidene fluoride, may be given a primer coat of phenolic resin to enhance mechanical bonding. The nylon film is known to solvate with the phenolic interface of the adjacent pre-preg layer to form a chemical bond that improves most mechanical properties, providing, e.g., improved flexing, impact and shatter resistance, and hoop strength; however, it is important to limit the degree of solvation in order to maintain a desired level of impermeability.

A layer of metallic film 38, e.g. an aluminum film 0.0007 to 0.0016 inch thick, can be included to render the wall impermeable and to reflect heat, thus lowering the heat release characteristics of the composite sandwich element. The metallic film may also be given a primer coat of phenolic resin to enhance mechanical bonding.

The composite sandwich element of the invention demonstrates both a low level of flammability (burn resistance) and a low heat release rate compatible with its planned final application within the pressure shell of a modern jet aircraft. In addition, all of the components of the composite sandwich element were chosen to demonstrate low toxicity of gases emitted by combustion. Methods for evaluation of composite sandwich elements, and the performance of the composite sandwich element of the invention, are described and quantified below.

Referring now to FIGS. 3A, 3B and 3C (and also to FIG. 3D), according to one aspect of the invention, an aircraft air-conditioning duct 6 of the invention can be fabricated by winding, onto a mandrel, strips that are equal in width to the mandrel length. In this manner, the first (inner) wall 14 of the composite is built up onto the mandrel by successive wraps (i.e., a "table wrap" method). In particular, referring to FIG. 3A, the first layer 104 applied about the mandrel 102 is a thin polymeric, i.e. nylon, film, which in this embodiment of an aircraft air-conditioning duct, also provides air impermeability. A strengthening layer 106 of phenolic resin impregnated woven scrim is applied over the nylon layer 104, and a non-woven/phenolic resin "pre-preg" layer 108 is applied over the scrim.

Referring next to FIG. 3B, the intervening layer 18 is formed upon the first wall 14 by providing one or more thin sheets of 110 of cellular or foamed imide resin which are placed about the wall 14 on mandrel 102. The sheets 110 may be spiral wound about the wall 14, as shown in FIG. 3B, or long thin sheets 112 may be placed about the wall 14 in the fashion of barrel staves (FIG. 3D).

Referring next to FIG. 3C, the second (outer) wall 16 is built up onto the intervening layer 18 by successive wraps (i.e., a "table wrap" method), in the manner of the first wall 14, described above. In particular, a non-woven/phenolic resin "pre-preg" layer 114 is applied over the layer 18, and a strengthening layer 116 of phenolic resin impregnated woven scrim is applied over the layer 114. A further layer 118 applied about the layer 116 is a thin metallic, i.e. aluminum, film, which in this embodiment of an aircraft air-conditioning duct, also provides reflection of heat and air impermeability.

The layers of polymeric and metallic film may be disposed at other positions within the composite sandwich element. However, in formation of a duct by the mandrel process just described, it is preferred to place the nylon film at a position to form the interior wall of the duct. In this position, the nylon film greatly aids in the release of the completed cured duct from the tooling or mandrel upon which it is formed. In the completed duct, it also provides a smooth surface desirable for flow of air within the duct. Also, where the composite sandwich element is a relatively thin wall duct, it is anticipated that the polymeric film will serve to further lower the level of sound produced by flow of air within the duct. A polymeric film may also limit absorption of water into the duct wall, although it is questionable whether a polymeric film of nylon will have an appreciable advantageous effect in this regard.

The metallic film 118 is typically incorporated into the composite sandwich element in instances where a very low level of heat release is desired. In the case of a fire, the metallic film will reflect a large segment of the exterior heat, and incorporation of the metallic film into the composite duct of the invention will further lower the heat release rate, i.e. beyond the level obtained with the fire retardants incorporated within the phenolic resin binder. The metallic film may be employed to particular advantage when incorporated at or near the outer surface of the duct. If the polymeric film is used in conjunction with the metallic film, the polymeric film is preferably disposed at a side of the metallic film opposite the side most likely to face a source of heat or fire.

The composite sandwich element is treated by heat, typically while still upon the mandrel 102, e.g. to cause chemical bonding between the nylon and phenolic resin, and also between the phenolic resin and the polyvinylidene fluoride, resulting in a duct 6 with very low weight, but high heat resistance, elasticity and resistance to impact. More importantly, performance of the composite material of the duct in the presence of fire more than exceeds the requirements for passenger safety established by the F.A.A.

WORKING EXAMPLES

Composite sandwich elements of the invention are formed with any of a number of combinations of materials using glass fibers, in woven, non-woven or scrim form, and a metallic film and/or a polymeric film.

The fiberglass woven cloth and fiberglass non-woven mat are saturated with phenolic resin containing appropriate amounts of suitable, state-of-the-art fire retardant chemicals, e.g. aluminum trihydrate, zinc borate or the like. The finished, cured, resinated fiberglass woven cloth used to form the walls of the composite sandwich element contains approximately 30 to 55% (by weight) phenolic resin. The finished, cured, resinated fiberglass non-woven mat of the walls of the composite sandwich element contains approximately 60 to 85% (by weight) phenolic resin.

The following are typical material combinations that might be employed in formation of the walls of a composite sandwich element in the form of an air-conditioning duct of aircraft.

EXAMPLE 1

Figure 4:
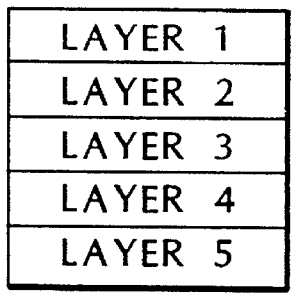
FIG. 4 is a somewhat diagrammatic side view of the wall of the embodiment of a composite sandwich element of FIG. 2A.

Referring to FIG. 4, layer 1 (the outermost layer) is a woven glass cloth 0.008 inch thick, 24×16 and 5.2 oz/yd$^2$ (e.g., Style 1964 Woven glass tape, available from Mutual Industries of Philadelphia, Pa.). Layer 2 is a fiberglass non-woven mat 1.4 oz/yd$^2$ (e.g., Ultra-Mat No. 83095A, available from Elk Corporation of Ennis, Tex.). Layer 3 is a metallic aluminum film 0.001 inch thick (e.g., available from Reynolds Metal Co. of Richmond, Va.). Layer 4 is also a fiberglass non-woven mat 1.4 oz/yd$^2$ (e.g., Ultra-Mat No. 83095A, Elk Corporation), and layer 5 (the innermost layer) is also a woven glass cloth 0.008 inch thick, 24×16 and 5.2 oz/yd$^2$ (e.g., Style 1964 Woven glass tape, Mutual Industries).

EXAMPLE 2

Figure 5:
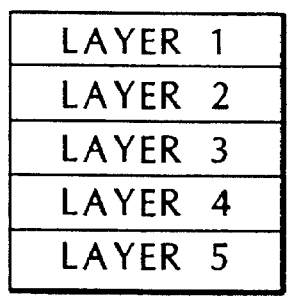
FIG. 5 is a somewhat diagrammatic side view of the wall of another embodiment of a composite sandwich element of the invention.

Referring to FIG. 5, layer 1 (the outermost layer) is a woven glass cloth 0.008 inch thick, 24×16 and 5.2 oz/yd$^2$ (e.g., Style 1964 Woven glass tape, Mutual Industries). Layer 2 is a fiberglass non-woven mat 1.4 oz/yd$^2$ (e.g., Ultra-Mat No. 83095A, Elk Corporation). Layer 3 is a polymeric nylon film 0.001 inch thick (e.g., available from Richmond Aircraft Products of Norwalk, Conn.). Layer 4 is also a fiberglass non-woven mat 1.4 oz/yd$^2$ (e.g., Ultra-Mat No. 83095A, Elk Corporation), and layer 5 (the innermost layer) is also a woven glass cloth 0.008 inch thick, 24×16 and 5.2 oz/yd$^2$ (e.g., Style 1964 Woven glass tape, Mutual Industries).

EXAMPLE 3

Figure 6:
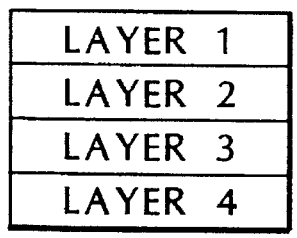
FIG. 6 is a somewhat diagrammatic side view of the wall of still another embodiment of a composite sandwich element of the invention.

Referring to FIG. 6, layer 1 (the outermost layer) is a woven glass cloth 0.008 inch thick, 24×16 and 5.2 oz/yd$^2$ (e.g., Style 1964 Woven glass tape, Mutual Industries). Layer 2 is a fiberglass non-woven mat 1.4 oz/yd$^2$ (e.g., Ultra-Mat No. 83095A, Elk Corporation). Layer 3 is also woven glass cloth 0.008 inch thick, 24×16 and 5.2 oz/yd$^2$ (e.g., Style 1964 Woven glass tape, Mutual Industries). Layer 4 (the innermost layer) is a polymeric nylon film 0.001 inch thick (e.g., available from Richmond Aircraft Products).

EXAMPLE 4

Figure 7:
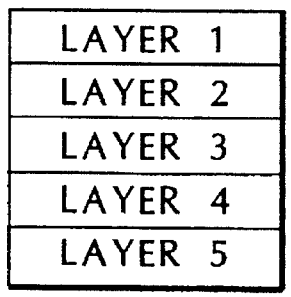
FIG. 7 is a somewhat diagrammatic side view of the wall of still another embodiment of a composite sandwich element of the invention.

Referring to FIG. 7, layer 1 (the outermost layer) is a fiberglass non-woven mat 1.4 oz/yd$^2$ (e.g., Ultra-Mat No. 83095A, Elk Corporation). Layer 2 is aluminum film 0.001 inch thick (e.g., available from Reynolds Metal Co.). Layer 3 is also a fiberglass non-woven mat 1.4 oz/yd$^2$ (e.g., Ultra-Mat No. 83095A), and layer 4 is also a woven glass cloth 0.008 inch thick, 24×16 and 5.2 oz/yd$^2$ (e.g., Style 1964 Woven glass tape, Mutual Industries). Layer 5 (the innermost layer) is a polymeric nylon film 0.001 inch thick (e.g., available from Richmond Aircraft Products).

EXAMPLE 5

Figure 8:
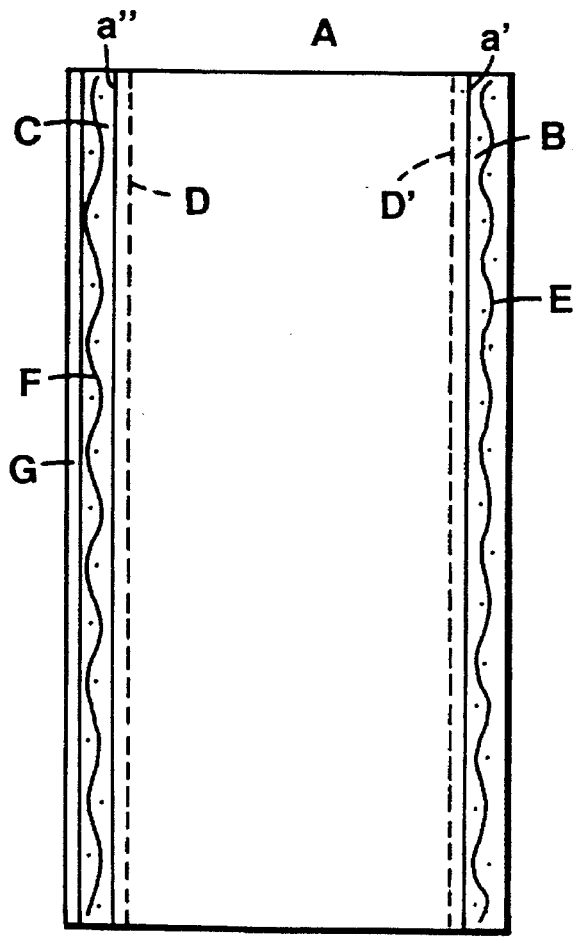
FIG. 8 is a somewhat diagrammatic side view of the wall of still another embodiment of a composite sandwich element of the invention.

Referring now to FIG. 8, a composite sandwich element consists of a center layer A formed of a single or multiple layers of a rigid or semi-rigid foam with a polymeric coating applied at the two extreme outer surfaces, a', a".

In this example, the foam layer A is a single layer of 0.25 inch thick imide foam having a density of 5 lbs./ft$^3$. Coating layers B, C applied to each side surface of the foam are a phenolic resin containing appropriate amounts of suitable, state-of-the-art fire retardant chemicals including as examples aluminum trihydrate and zinc borate. The coating layers B, C were applied in a manner to control the amount applied and the depth to which the coating material penetrated into the foam (lines D, D').

One or more layers of a reinforcing fibers network (woven or nonwoven) may be applied to an outer surface or surfaces of the foam, either before, during or after application of the phenolic resin. In this example, a fiber network E at the first surface a' consisted of a woven fiberglass scrim laid onto the outer surface of the coated foam with the resin coating B in the wet state prior to cure, and a fiber network F at the second surface a" consisted of a woven glass cloth similarly applied to the opposite outer surface of the coated foam, again with the resin coating C in wet state prior to cure.

In this example, to provide additional protection and/or decoration, a sheet of TEDLAR™ polyvinylidene fluoride film G was placed against the outer surface of the foam having the woven glass cloth F in place on the resin coating.

The resulting laminate of glass scrim E, resin coating (with flame retardant) B, imide foam A, resin coating (with flame retardant) C, woven glass F and TEDLAR™ film G was then placed in a press and heat and pressure were applied to effect a resin cure and a bond to integrate all of the components of the composite sandwich element.

The composite sandwich element can then be molded to a flat or curved plane, as desired.

TESTING

The composite sandwich elements formed according to the examples were evaluated using the test methods described for performance in the presence of fire. The composite sandwich elements of the invention exhibited levels of heat release, flammability, smoke release and toxic gas release below predetermined levels considered suitable for use within the passenger compartment of a commercial aircraft.

In particular, composite sandwich elements of the invention had a typical peak heat release rate of less than 50 kw/m$^2$ (and typically less than 45 kw/m$^2$) and a two minute heat release of less than 50 kw-min/m$^2$ (and typically less than 45 kw-min/m$^2$), when tested in accordance with the requirements of FAR 25.853(a–1) through Amendment 25–66 and FAR 121.312(a)(1) through Amendment 121–198. Furthermore, those composite sandwich elements of the invention including a metallic barrier film, when tested in the same manner, exhibited a typical peak heat release rate of less than about 30 kw/m$^2$ and a two minute heat release of less than about 30 kw-min/m$^2$. By way of comparison, the maximum peak heat release permitted by the FAA is 65 kw/m$^2$ and the maximum two minute heat release permitted by the FAA is 65 kw-min/m$^2$.

Composite sandwich elements of the invention were also tested for flammability, using the vertical flammability tests specified in FAR 25.853(a) and FAR 25.853(b). The composite sandwich elements of the invention had a burn length of less than 1.0 inch after 60 seconds. Again, by way of comparison, the maximum burn length permitted by the FAA is 6.0 inches after 60 seconds.

Composite sandwich elements of the invention were also tested for the level of smoke release, measured as specific optical density ($D_s$), in accordance with the requirements of FAR 25.853(a–1) through Amendment 25–66 and FAR 121.132 through Amendment 121–198. The composite sandwich elements of the invention exhibited a typical (four minute) specific optical density ($^4D_m$) of 75 or less. In contrast, the average maximum specific optical density ($^4D_m$) permitted by a major U.S. aircraft manufacturer is 150, while the FAA standard is 200.

In air permeability testing, a typical composite sandwich element of the invention including a barrier layer of polymeric film shows negligible air flow through the wall at a pressure differential of 20 psi.

Composite sandwich elements of the invention also typically exhibit tensile strength of at least 18,000 psi, and burst strength of greater that 30 psi.

Composite sandwich elements in the form of lower weight ducts (e.g. 1 oz/ft/in ID) also typically satisfy appropriate requirements for span load testing, compress-to-break testing and impact testing.

Composite sandwich elements of the configurations shown in FIGS. 9–18 were tested in accordance with the requirements of FAR 25.853(a–1) through Amendment 25–66 and FAR 121.312(a)(1) through Amendment 121–198 and exhibited the typical peak heat release rate (measured in kw/m$^2$) and two minute heat release (measured in kw-min/m$^2$) shown in the Table 1 and Table 2 below.

TABLE 1

Figure 9:
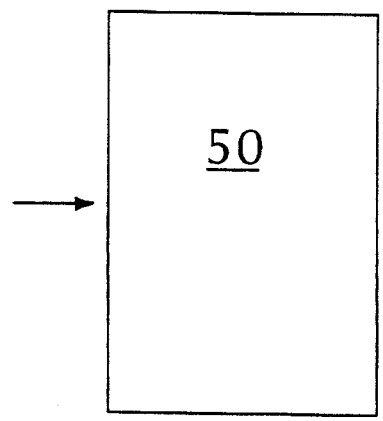
FIGS. 9–18 are somewhat diagrammatic exploded side views of other embodiments of a composite sandwich element of the invention.
Figure 10:
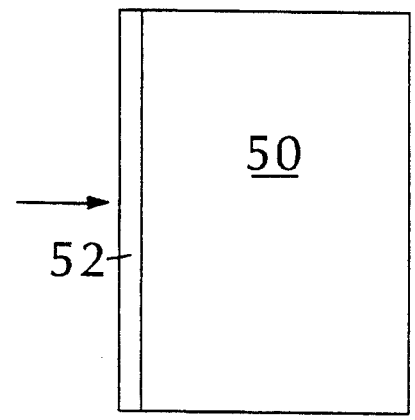
Figure 11:
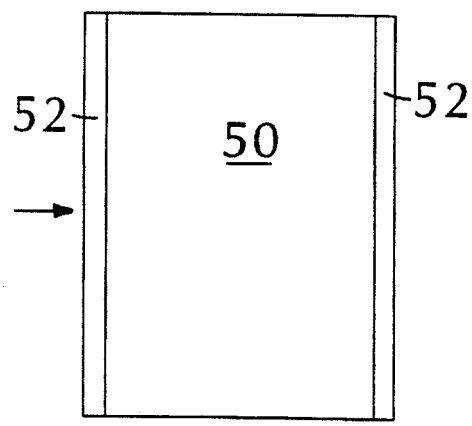
Figure 12:
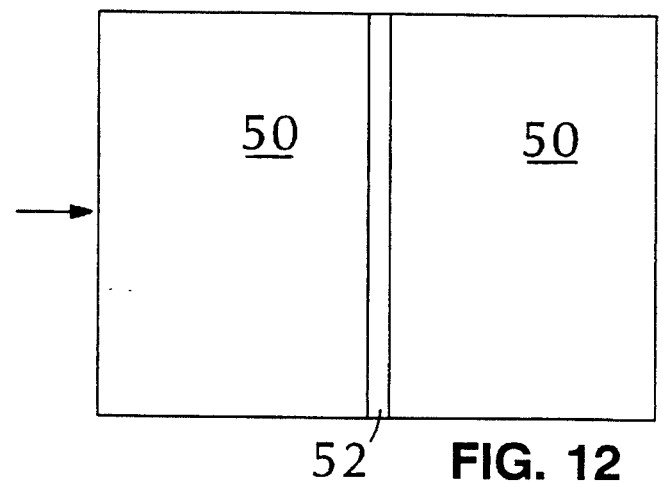

| Configuration | Peak Heat Release Rate | Two Minute Heat Release |
|---|---|---|
| Insulating layer only [FIG. 9] | 15 | 11 |
| Polymeric film/ insulating layer [FIG. 10] | 21 | 12 |
| Polymeric film/insulating layer/polymeric film [FIG. 11] | 21 | 20 |
| Insulating layer/polymeric film/insulating layer [FIG. 12] | 17 | 3 |
| Glass cloth/polymeric film/ glass cloth/insulating | 29 | 23 |

TABLE 1-continued

Figure 13:
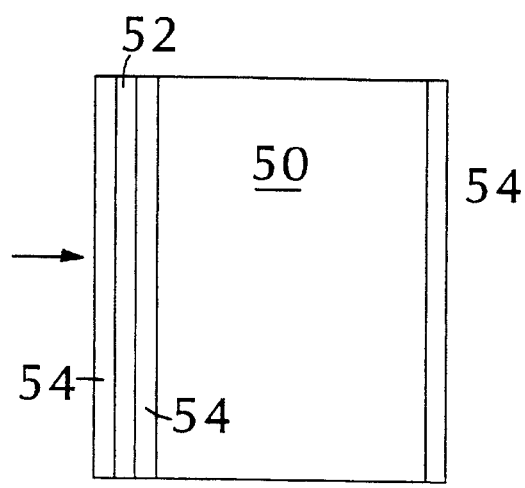
Figure 14:
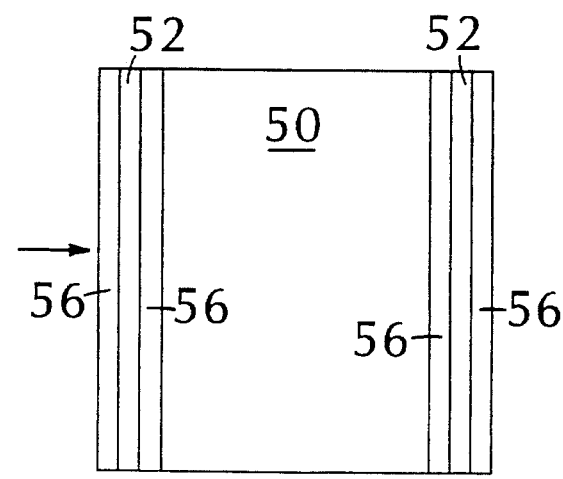
Figure 15:
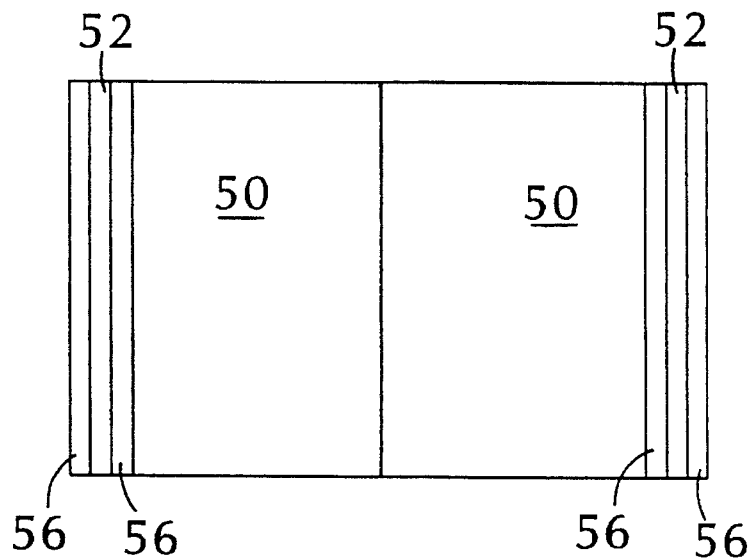

| Configuration | Peak Heat Release Rate | Two Minute Heat Release |
|---|---|---|
| layer/glass cloth [FIG. 13] | | |
| Glass strips/polymeric film/ glass strips/insulating layer/ glass strips/polymeric film/ glass strips [FIG. 14] | 27 | 31 |
| Glass strips/polymeric film/ glass strips/insulating layer/ insulating layer/glass strips/ polymeric film/glass strips [FIG. 15] | 26 | 18 |

(As mentioned above, and by way of comparison, the maximum peak heat release permitted by the FAA is 65 kw/m² and the maximum two minute heat release permitted by the FAA is 65 kw-min/m².)

The composite sandwich elements shown in FIGS. 9–15 (and represented in Table 1, above) include one or more of the following layers: a layer of insulating material 50 (polyimide foam about 0.187 inch thick, e.g., available from Imi-Tech Corporation), a polymeric film 52 (polyvinylidene fluoride film 0.001 inch thick, e.g., TEDLAR™ film available from DuPont), a layer of phenolic resin impregnated glass cloth sheets 54 (0.020 inch thick), and/or a layer of resin impregnated glass cloth strips 56 (0.020 inch thick). The direction of application of the flame is indicated by the arrow. The layers are listed in Table 1 in the direction moving away from the flame.

TABLE 2

Figure 16:
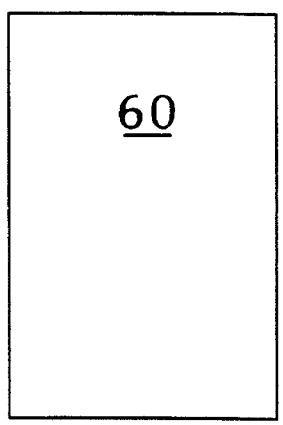
Figure 17:
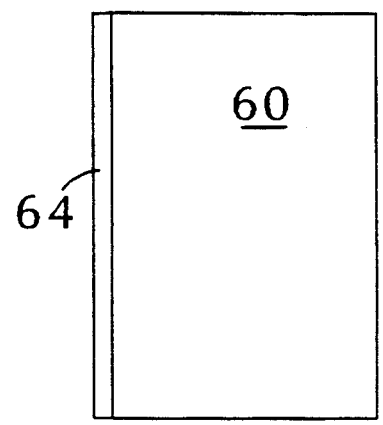
Figure 18:
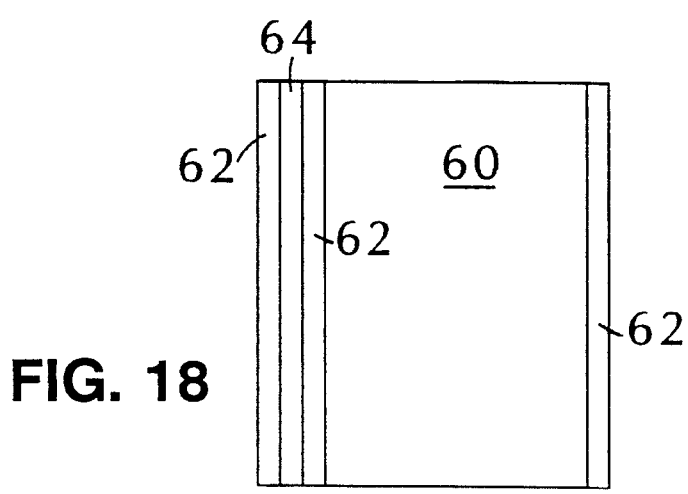

| Configuration | Peak Heat Release Rate | Two Minute Heat Release |
|---|---|---|
| Insulating layer only [FIG. 16] | 15 | 11 |
| Metallic foil/ insulating layer [FIG. 17] | 4 | 2 |
| Glass cloth/metallic foil/ glass cloth/insulating layer/glass cloth [FIG. 18] | 15 | 8 |

The composite sandwich elements shown in FIGS. 16–18 (and represented in Table 2, above) include one or more of the following layers: a layer of insulating material 60 (polyimide foam about 0.187 inch thick, e.g., available from Imi-Tech Corporation), a layer of phenolic resin impregnated glass cloth sheets 62 (0.020 inch thick), and/or a layer of metallic film 64 (aluminum film 0.001 inch thick, e.g., available from Reynolds Metal Co. of Richmond, Va.). Again, the direction of application of the flame is indicated by the arrow. The layers are also listed in Table 2 in the direction moving away from the flame.

Other embodiments are within the following claims. For example, composite sandwich elements of the invention may be employed in the form of other structural, non-weight bearing elements of an aircraft passenger compartment, e.g. wall and ceiling panels. In these and other embodiments, the order of the composite layers may be varied as desired according to the desired application. For example, in wall panels, where the non-woven layer is to be the passenger compartment side of the panel for reasons of appearance, the metallic film may be applied upon the nylon film, e.g. as the opposite surface layer, in order to better retard penetration of heat into the passenger compartment in the event of a fire.

Other materials suitable for sound and/or thermal insulation may be substituted for the cellular polymeric foam.

Also, multiple layers of non-woven and/or woven pre-preg material may be employed for adding bulk to the composite sandwich element, and thus increasing wall thickness and stiffness, where such characteristics are desired.

Although the foregoing describes several embodiments of a composite sandwich element of the invention, it is understood that the invention may be practiced in still other forms, including but not limited to with greater or fewer layers, still within the scope of the following claims. For example, the concept of the invention may be employed also in underwater environments, i.e. in submarines, with similar performance requirements for heat release, flammability, smoke release and/or toxic gas release.

What is claimed is:

1. A composite sandwich element comprising:
   at least one wall layer comprising a fibrous web impregnated with a phenolic resin binder, said fibrous web having a sufficiently high void volume to carry a volume of said phenolic resin binder sufficient to provide said composite sandwich element with structural integrity, and
   a layer consisting essentially of cellular polymeric foam or felt of imide polymeric material bonded to a surface of said at least one wall layer.

2. The composite sandwich element of claim 1 wherein said fibrous web comprises glass fibers.

3. The composite sandwich element of claim 1 further comprising a second wall layer, wherein said layer of cellular polymeric foam or felt is disposed between said first wall layer and said second wall layer.

4. The composite sandwich element of claim 1, further comprising a barrier film adapted to render said composite sandwich element impermeable to air.

5. The composite sandwich of claim 4 wherein the maximum flow of air through the composite sandwich, with a pressure differential of 20 psi thereacross, does not exceed 0.005 ft³/min/ft².

6. The composite sandwich element of claim 4 wherein said barrier film comprises a polymeric film.

7. The composite sandwich element of claim 6 wherein said polymeric film consists essentially of polyvinylidene fluoride.

8. The composite sandwich element of claim 4 or 6 wherein said barrier film comprises a metallic film.

9. The composite sandwich element of claim 8 wherein said metallic film consists essentially of aluminum.

10. The composite sandwich element of claim 1 wherein said phenolic resin binder comprises chemical agents adapted to reduce the rate of heat release, and
    said layer of cellular polymeric foam or felt of imide polymeric material is at least about 0.100 inch thick.

11. The composite sandwich element of claim 10 wherein said chemical agents adapted to reduce the rate of heat release are selected from the group consisting of aluminum trihydrate and zinc borate.

12. The composite sandwich element of claim 10 or having a peak heat release rate of less than 50 kw/m² and a two minute heat release of less than 50 kw-min/m² when tested in accordance with the requirements of FAR 25.853(a–1) through Amendment 25–66 and FAR 121.312(a)(1) through Amendment 121–198.

13. The composite sandwich element of claim 12 wherein said peak heat release rate is less than 45 kw/m² and said two minute heat release of less than 45 kw-min/m².

14. The composite sandwich element of claim 1 wherein said fibrous web is a non-woven web.

15. The composite sandwich element of claim 14 wherein said non-woven web comprises glass fibers.

16. The composite sandwich element of claim 1 wherein said fibrous web is a woven cloth.

17. The composite sandwich element of claim 16 wherein said woven cloth comprises glass cloth.

18. A composite sandwich element having levels of heat release, flammability, smoke release and toxic gas release below predetermined levels considered suitable for use within the passenger compartment of a commercial aircraft, said sandwich element comprising:

at least one wall layer comprising a fibrous web impregnated with a phenolic resin binder, said fibrous web having a sufficiently high void volume to carry a volume of said phenolic resin binder sufficient to provide said composite sandwich element with structural integrity, and a layer of cellular polymeric foam or felt of imide polymeric material bonded to a surface of said at least one wall layer, and a metallic barrier film, selected and positioned to render said composite sandwich element impermeable to air, bonded to a portion of said composite element.

* * * * *